United States Patent
Hermann et al.

(10) Patent No.: US 10,661,798 B2
(45) Date of Patent: May 26, 2020

(54) METHOD FOR OPERATING A DISTANCE AND SPEED REGULATING FUNCTION OF A VEHICLE AND DRIVER ASSISTANCE SYSTEM FOR CARRYING OUT THE METHOD

(71) Applicant: DAIMLER AG, Stuttgart (DE)

(72) Inventors: Klaus Hermann, Gärtringen (DE); Gerhard Noecker, Goeppingen (DE)

(73) Assignee: DAIMLER AG, Stuttgart (DE)

( * ) Notice: Subject to any disclaimer, the term of this patent is extended or adjusted under 35 U.S.C. 154(b) by 200 days.

(21) Appl. No.: 15/771,602

(22) PCT Filed: Sep. 10, 2016

(86) PCT No.: PCT/EP2016/001526
§ 371 (c)(1),
(2) Date: Apr. 27, 2018

(87) PCT Pub. No.: WO2017/071787
PCT Pub. Date: May 4, 2017

(65) Prior Publication Data
US 2018/0326985 A1    Nov. 15, 2018

(30) Foreign Application Priority Data
Oct. 31, 2015   (DE) .................. 10 2015 014 139

(51) Int. Cl.
*B60W 30/16*     (2020.01)
*B60W 50/14*     (2020.01)
(Continued)

(52) U.S. Cl.
CPC .......... *B60W 30/162* (2013.01); *B60W 30/14* (2013.01); *B60W 40/08* (2013.01);
(Continued)

(58) Field of Classification Search
CPC ....... B60W 2050/143; B60W 2050/14; B60W 2050/20; B60W 2050/30;
(Continued)

(56) References Cited

U.S. PATENT DOCUMENTS 8,606,455 B2   12/2013   Boehringer et al.
9,550,500 B2   1/2017    Hackenberg et al.
(Continued)

FOREIGN PATENT DOCUMENTS

DE   102009048954 A1   4/2011
DE   102010049081 A1   4/2012
(Continued)

OTHER PUBLICATIONS

International Search Report dated Nov. 25, 2016 in related International Application No. PCT/EP2016/001526.
(Continued)

*Primary Examiner* — Hunter B Lonsberry
*Assistant Examiner* — Matthew J. Reda
(74) *Attorney, Agent, or Firm* — Patent Portfolio Builders PLLC

(57) ABSTRACT

The speed of a vehicle and the distance of the vehicle from at least one other vehicle are autonomously controlled. When the driver is inattentive and at least one other criteria is fulfilled, at least one measure increasing driving safety is introduced.

10 Claims, 1 Drawing Sheet

(51) Int. Cl.
*B60W 30/14* (2006.01)
*B60W 40/08* (2012.01)
*G05D 1/00* (2006.01)

(52) U.S. Cl.
CPC .......... *B60W 50/14* (2013.01); *G05D 1/0088* (2013.01); *B60W 2040/0818* (2013.01); *B60W 2050/143* (2013.01); *B60W 2552/00* (2020.02); *B60W 2554/00* (2020.02); *B60W 2554/80* (2020.02); *G05D 2201/0213* (2013.01)

(58) Field of Classification Search
CPC ......... B60W 2040/0818; B60W 30/14; B60W 30/162; G05D 1/0088; G05D 2201/0213
See application file for complete search history.

(56) References Cited

U.S. PATENT DOCUMENTS

| | | | |
|---|---|---|---|
| 2012/0101689 | A1 | 4/2012 | Schramm |
| 2016/0001781 | A1* | 1/2016 | Fung ..................... B60R 25/25 701/36 |

FOREIGN PATENT DOCUMENTS

| | | |
|---|---|---|
| DE | 102011117431 A1 | 4/2012 |
| DE | 102012112802 A1 | 6/2014 |
| DE | 102013219887 A1 | 4/2015 |

OTHER PUBLICATIONS

Written Opinion dated Nov. 25, 2016 in related International Application No. PCT/EP2016/001526.

* cited by examiner

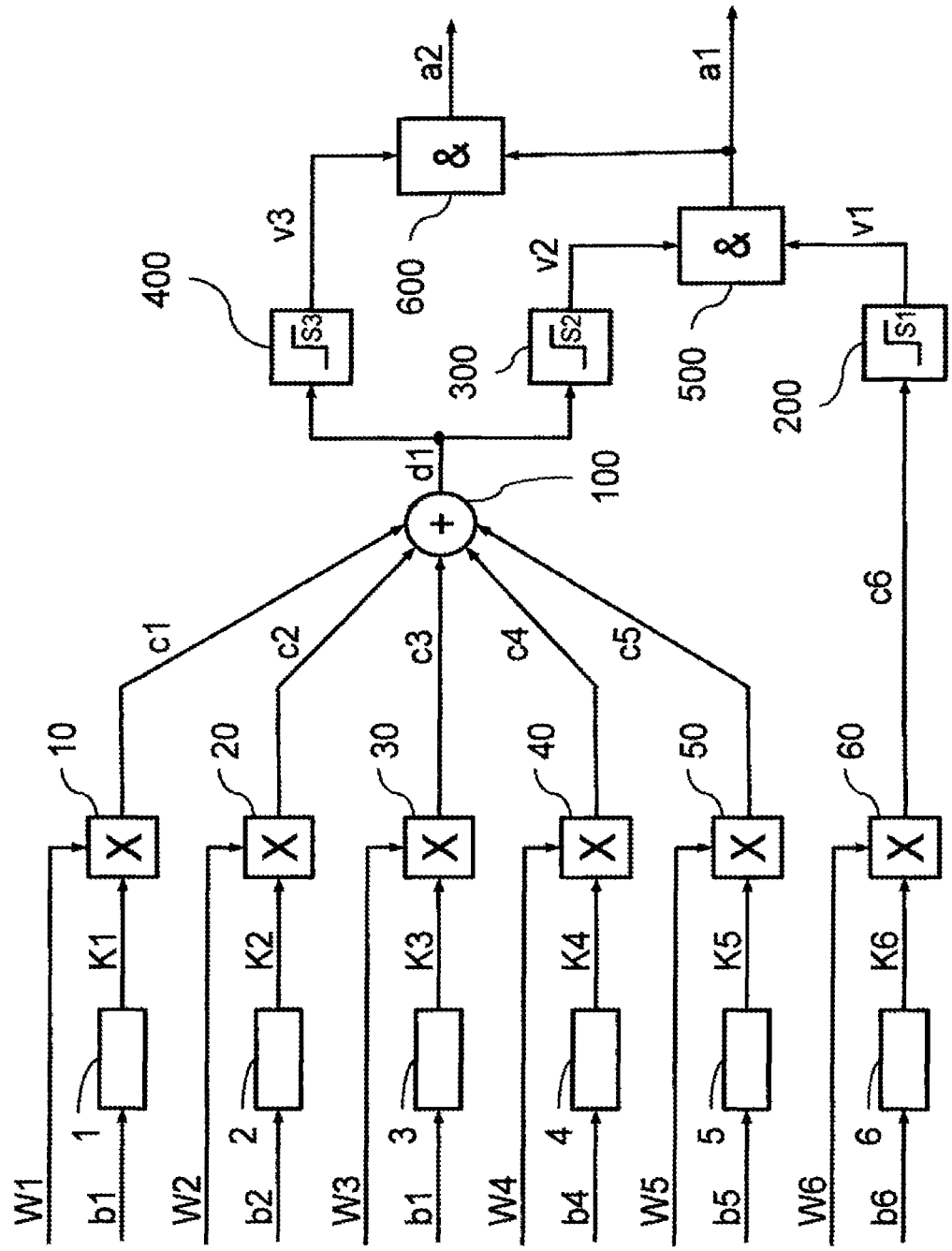

METHOD FOR OPERATING A DISTANCE AND SPEED REGULATING FUNCTION OF A VEHICLE AND DRIVER ASSISTANCE SYSTEM FOR CARRYING OUT THE METHOD

BACKGROUND AND SUMMARY OF THE INVENTION

Exemplary embodiments of the invention relate to a method for operating a distance and speed regulating function of a vehicle and a driver assistance system for carrying out such a method and a vehicle having such a driver assistance system.

A generic method for operating a distance and speed regulating function of a vehicle is known from German patent document DE 10 2011 117 431 A1 in which the level of attentiveness of a driver of the vehicle is detected and in which, depending on the level of attentiveness detected, measures for increasing the driving safety are introduced, wherein these measures comprise a change of a nominal distance or a nominal speed of the distance and speed regulating function.

A method for operating a vehicle is known from German patent document DE 102010049081 A1 in which it is ascertained whether the driver of the vehicle is distracted because of an actuation of operating elements of the vehicle's system, for example an information and entertainment system, an air conditioning system, a mirror adjustment device, a seat adjustment device, a navigation system, a driver assistance system or a telephone system. If this is the case, a nominal distance of a distance regulating function of the vehicle is increased which leads to an increase in driving safety.

Exemplary embodiments of the invention are directed to a method of the type mentioned above and a driver assistance system and a vehicle, in which the operating mode of the distance and speed regulating function is improved.

In the method according to the invention for operating a distance and speed regulating function of a vehicle, hereinafter called the ego-vehicle, at least one measure increasing driving safety is introduced when the predetermined trigger criteria for introducing these measures are fulfilled. The predetermined trigger criteria here comprise the determination of low driver attentiveness of the driver of the ego-vehicle, and the fulfilment of at least one of the following additional conditions:

a) the ego-vehicle is approaching a location that is critical in terms of the route, for example a curve, an inclined section, a lane constriction, an entry slip road or an exit slip road, or the ego-vehicle is already at such a location, b) the ego-vehicle is approaching a location with traffic disruptions, for example a building site or a traffic jam, or the ego-vehicle is already at such a location, c) the ego-vehicle is approaching a location with visibility impairments, for example a tunnel entry or tunnel exit, or the ego-vehicle is already at such a location, d) the ego-vehicle is accelerated by the distance and speed regulating function, for example because of a road becoming clearer after a slow vehicle ahead has turned off, e) the ego-vehicle is at a location at which there is an anomaly of the traffic flow, which is the case, for example, when there is a higher vehicle density in adjacent lanes than in the lane of the ego-vehicle, and/or when a speed decrease relative to the speed of the ego-vehicle is registered in adjacent overtaking lanes and/or when a speed increase relative to the speed of the ego-vehicle is registered in adjacent non-overtaking lanes. Here, overtaking lanes are lanes that are to be used for overtaking procedures, and non-overtaking lanes are lanes that are not to be used for overtaking procedures.

This means that the condition for the introduction and preferably also for the implementation of the at least one measure increasing driving safety is that the driver of the ego-vehicle is inattentive and that one or more of the conditions a) to e) is fulfilled. Advantageously, the at least one measure increasing driving safety is terminated or ended after its introduction when it is determined that the driver is attentive again, or when the trigger criteria for the introduction of the at least one measure increasing driving safety are no longer fulfilled.

In an advantageous embodiment of the method, the at least one measure increasing driving safety comprises at least one of the following actions:

the emission of a warning to the driver of the ego-vehicle in order to request the driver to turn his/her attention to the traffic, the increase of a nominal distance of the distance regulating function, in particular up to a maximum distance that can be predetermined, the limitation of a nominal speed of the speed regulating function, in particular to a value below a maximum speed that can be predetermined, which is preferably predetermined depending on a traffic flow in the vehicle surrounding area of the ego-vehicle. Here, traffic flow is to be understood as the average number of vehicles that pass a route section per time unit.

With the ego-vehicle, the method according to the invention is advantageously used during an automatic or highly automated driving operation.

The driver assistance system for a vehicle is set up according to the invention for carrying out the method according to the invention, and it is a component of a vehicle driving automatically or in a highly automated manner.

BRIEF DESCRIPTION OF THE DRAWING FIGURE

The invention is explained in more detail below by means of exemplary embodiments with reference to the FIGURE, which is a block diagram of the method used in the ego-vehicle.

DETAILED DESCRIPTION

The method is used in the ego-vehicle during a highly automated or autonomous driving operation. To do so, the ego-vehicle has an assistance system having a distance and speed regulating function, said system taking over the driving tasks during the highly automated or autonomous driving operation and provides the driver of the ego-vehicle the opportunity to concern himself with ancillary activities, such as operating the vehicle's own devices or devices that are not related to the vehicle, for example, surfing the internet, reading emails or books, turning to face the other occupants of the vehicle, etc. When a situation occurs during the highly automated or automatic driving operation, for whose management the assistance system is not set up, the driver is requested to take over the driving tasks. However, with ancillary activities that take longer, it can result in greater changes in terms of the traffic, in terms of the road conditions and in terms of visibility conditions, which make orientation difficult for the driver in the event of a take-over request and thus lengthens the amount time that the driver needs for the take-over of the driving tasks.

The idea of the invention is to introduce measures increasing driving safety when it is recognized that the driver has turned his/her attention away from the traffic situation, and when there is a situation in which it can be assumed that it is likely to become difficult for an inattentive driver to quickly and safely take over the driving tasks.

To do so, different features of the vehicle surrounding area, of the ego-vehicle and of the driver are detected. In the FIGURE, these features are depicted with the reference numerals b1, b2, b3, b4, b5, b6.

The first feature b1 here represents information about critical locations in the course of the road in front of the ego-vehicle. Specifically, this is information about curves, inclines, lane constrictions, entry slip roads, exit slip roads lying ahead and about the distances to these locations. This information is taken from digital map data.

The second feature b2 represents information about locations with traffic disruptions in front of the ego-vehicle. Specifically, this is information about building sites or traffic jams and about the distances to these locations. This information is received via radio from an external server.

The third feature b3 represents information about locations with visibility impairments. Specifically, this is information about the brightness or brightness change in the surrounding area of the ego vehicle. This information is determined by analysis of camera data, for example. Yet the analysis of digital map data is also conceivable, since from this, conclusions about brightness changes because of tunnel entrances and tunnel exits can be made.

The fourth feature b4 represents information about an acceleration requested by the distance and speed regulating function of the driver assistance system at the present moment. Specifically, this is information about a slope, i.e., gradients, of the requested acceleration.

The fifth feature b5 represents information about the traffic flow in the surrounding area of the ego-vehicle. Specifically, this is information about the traffic density in adjacent lanes and about the relative speeds of the vehicles in the adjacent lanes in relation to the ego-vehicle. This information is determined by means of a sensor, for example by means of ultrasound, laser, radar or camera sensors.

The sixth feature b6 represents information about viewing directions of the driver, and operating activities of the driver on the vehicle's own systems or systems not related to the vehicle. Specifically, this is information about looking away from the road, viewing frequencies, viewing durations of the road or operating activities and operating durations for infotainment systems. This information is recorded by means of a camera by observing the driver or by analyzing operating activities. Here, the term infotainment system is to be understood as an information and entertainment system, an air conditioning system, a mirror adjustment system, a seat adjustment system, a navigation system, an operating device of a driver assistance system or a telephone system.

In the present case, the term distance is to be understood as both metric distances and time intervals, i.e., time durations that the ego-vehicle requires to achieve the respective position.

The information of the first feature b1 is analyzed in a first analysis unit 1, for example by a weighted or fuzzy summation of the information supplied in order to generate a first criticality measure K1 stating how critical the course of the road lying ahead is. For example, in the event of a curve lying ahead, the first criticality measure K1 is higher, the greater the curvature of the curve and the smaller its distance to the ego-vehicle.

The information of the second feature b2 is analyzed in a second analysis unit 2 in order to generate a second criticality measure K2 stating how critical the traffic disruption lying ahead is. For example, in the event of a building site lying ahead, the second criticality measure K2 is higher, the smaller the distance to the building site.

The information of the third feature b3 is analyzed in a third analysis unit 3 in order to generate a third criticality measure K3 stating how critical a visibility impediment lying ahead is. For example, the third criticality measure K3 is higher, the lower the surrounding brightness or the greater the brightness change, for example when entering a tunnel or exiting the tunnel.

The information of the fourth feature b4 is analyzed in a fourth analysis unit 4 in order to generate a fourth criticality measure K4 stating how critical the current dynamic state of the ego-vehicle is. For example, the fourth criticality measure K4 is higher, the more dynamically the ego-vehicle is driving, i.e., the more sharply the ego-vehicle is accelerated as a result of the distance and speed regulating function.

The information of the fifth feature b5 is analyzed in a fifth analysis unit 5 in order to generate a fifth criticality measure K5 stating how critical the traffic situation in the adjacent lanes of the ego-vehicle is. For example, the fifth criticality measure K5 is higher, the higher an anomaly of the traffic flow in the surrounding area of the ego-vehicle is. An anomaly of the traffic flow is present, for example, when the distances between the vehicle in an adjacent lane are smaller than the distance the ego-vehicle maintains relative to a vehicle driving ahead, i.e., when there is a higher vehicle density in adjacent lanes than in the lane of the ego-vehicle. Here, the anomaly is higher the greater the difference between the vehicle density in the lane of the ego-vehicle and the adjacent lane. Yet an anomaly of the traffic flow is also present when a speed decrease relative to the speed of the ego vehicle can be registered in an adjacent overtaking lane. Here, an overtaking lane is to be understood as a lane in which driving is faster than in the lane of the ego-vehicle. In countries with right-hand traffic, this is the adjacent lane to the left and in countries with left-hand traffic, this is the adjacent lane to the right. Correspondingly, there is also an anomaly of the traffic flow present when a speed increase in relation to the speed of the ego-vehicle is registered in an adjacent non-overtaking lane. Here, a non-overtaking lane is to be understood as a lane in which driving may not be faster than in the lane of the ego-vehicle. Here, the anomaly is higher the more significantly the speed in the adjacent lanes increases or decreases. As a result, the fifth criticality measure K5 is greater, the higher the probability that adjacent vehicles will carry out a lane change into the lane of the ego-vehicle because of a more favorable traffic flow in the lane of the ego-vehicle.

The information of the sixth feature b6 is analyzed in a sixth analysis unit 6, for example, by a weighted or fuzzy summation of the information supplied, to generate a sixth criticality measure K6 stating how critical the attentiveness state of the driver of the ego-vehicle is. For example, the sixth criticality measure K6 is higher, the lower the driver attentiveness of the driver is. The driver attentiveness is lower and the sixth criticality measure K6 is correspondingly higher, the longer the driver looks away from the road, the less often the viewing frequencies of the driver are on the road, the shorter the viewing duration of the driver on the road, the more intensive the operating activities of the driver and the longer these take.

The criticality measures $K_1$, $K_2$, $K_3$, $K_4$, $K_5$, $K_6$ are advantageously defined in such a way that they assume values between 0 and 1, wherein the value 0 corresponds to a minimum criticality 1, the value 1 to a maximum criticality.

According to the FIGURE, the first criticality measure $K_1$ is weighted in a first weighting unit 10 by a predetermined first weighting factor $W_1$ to form a first weighted criticality measure $c_1$. Similarly, the second criticality measure $K_2$ is weighted in a second weighting unit 20 by a predetermined second weighting factor $W_2$ to form a second weighted criticality measure $c_2$, the third criticality measure $K_3$ is weighted in a third weighting unit 30 by a third predetermined weighting factor $W_3$ to form a third weighted criticality measure $c_3$, the fourth criticality measure $K_4$ is weighted in a fourth weighting unit 40 by a fourth predetermined weighting factor $W_4$ to form a fourth weighted criticality measure $c_4$, the fifth criticality measure $K_5$ is weighted in a fifth weighting unit 50 by a fifth predetermined weighting factor $W_5$ to form a fifth weighted criticality measure $c_5$ and the sixth criticality measure $K_6$ is weighted in a sixth weighting unit 60 by a sixth predetermined weighting factor $W_6$ to form a sixth weighted criticality measure $c_6$.

The first weighted criticality measure $c_1$, the second weighted criticality measure $c_2$, the third weighted criticality measure $c_3$, the fourth weighted criticality measure $c_4$ and the fifth weighted criticality measure $c_5$ are then added up in a summation device 100 to form a sum signal $d_1$ representing one measure of the criticality of the surrounding situation.

The sixth weighted criticality measure $c_6$ is compared to a predetermined first threshold $S_1$ in a first comparison device 200. The result of this comparison is a first comparison signal $v_1$.

The sum signal $d_1$ is compared to a predetermined second threshold $S_2$ in a second comparison device 300. The result of this comparison is a second comparison signal $v_2$.

The sum signal $d_1$ is further compared to a predetermined third threshold $S_3$ in a third comparison device 400. Here, the third threshold $S_3$ is greater than the second threshold $S_2$. The result of this comparison is a third comparison signal $v_3$.

A first system command $a_1$ is generated from the first comparison signal $v_1$ and the second comparison signal $v_2$ by an AND operation that is carried out in a first logic unit 500. A second system command $a_2$ is generated from the first system command $a_1$ and the third comparison signal $v_3$ by an AND operation that is carried out in a second logic unit 600.

The first system command $a_1$ triggers the emission of a warning by means of which the driver is requested to turn his attention to the traffic. The second system command $a_2$ triggers the increase of a nominal distance and reduction of a nominal speed of the distance and speed regulating function. The nominal distance is here advantageously increased to a predetermined maximum value, for example to a value which the driver can maximally set by means of a manual input. The nominal speed is advantageously reduced to an average surrounding speed which represents a sliding average of the speeds of vehicles in the lane of ego-vehicle and the adjacent lanes.

As a result, the driver is requested to turn his attention to the traffic when a critical surrounding situation is detected with a low driver attentiveness, and, with an even more critical surrounding situation, the target values of the distance and speed regulating function are additionally modified into a direction increasing driving safety. When the driver attentiveness is once again established, the system commands $a_1$, $a_2$ are ended and the measures increasing safety introduced by them are terminated.

As a result of these measures, the safety reserves of the system are increased during highly automated or automatic driving operation because they shift the driver into the position to quickly and safely take over the driving tasks as needed.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the FIGURES enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for operation of a vehicle, the method comprising:
   autonomously controlling a speed of the vehicle and a distance of the vehicle from at least one other vehicle;
   determining that predetermined trigger criteria is fulfilled; and
   implementing at least one measure increasing vehicle safety responsive to the determination that the predetermined trigger criteria is fulfilled,
   wherein the predetermined trigger criteria includes that a driver of the vehicle is inattentive and at least one of the following additional criteria
   a) the vehicle is approaching, or is at, a location with visibility impairments caused by a surrounding brightness or by brightness changes, and
   b) there is an anomaly of traffic flow in an area surrounding the vehicle, wherein the anomaly of traffic flow is a higher vehicle density in lanes of the vehicle adjacent to a lane of the vehicle, there is a speed decrease of a vehicle in an overtaking lane adjacent to the vehicle relative to the speed of the vehicle, or there is a speed increase of a vehicle in a non-overtaking lane adjacent to the vehicle relative to the speed of the vehicle.

2. The method of claim 1, wherein the predetermined trigger criteria further comprises at least one of the following additional criteria:
   c) the vehicle is accelerated by the autonomous control of the speed of the vehicle and the distance of the vehicle from the at least one other vehicle, d) the vehicle is approaching, or is at, a location that is critical in terms of a route of the vehicle, and
   e) the vehicle is approaching, or is already at, a location with traffic disruptions.

3. The method of claim 1, wherein the at least one measure increasing driving safety comprises emission of a warning requesting the driver to turn his/her attention to the traffic surrounding the vehicle.

4. The method of claim 1, wherein the at least one measure increasing driving safety comprises increasing a nominal distance of the vehicle relative to the at least one other vehicle.

5. The method of claim 4, wherein the nominal distance is increased to a maximum, predetermined distance.

6. The method of claim 1, wherein the at least one measure increasing driving safety comprises limiting a nominal speed of the autonomous control of the speed of the vehicle.

7. The method of claim 6, wherein the nominal speed is limited to a maximum speed, which is dependent on the traffic flow in the area surrounding the vehicle.

8. The method of claim 1, wherein the at least one measure increasing driving safety is terminated when it is determined that the driver is no longer inattentive.

9. The method of claim 1, wherein the vehicle is operated in an automatic or highly automated driving operation.

10. A driver assistance system for a vehicle, wherein the driver assistance system is configured to:

autonomously control a speed of the vehicle and a distance of the vehicle from at least one other vehicle;

determine that predetermined trigger criteria is fulfilled; and implement at least one measure increasing vehicle safety responsive to the determination that the predetermined trigger criteria is fulfilled, wherein the predetermined trigger criteria includes that a driver of the vehicle is inattentive and at least one of the following additional criteria a) the vehicle is approaching, or is at, a location with visibility impairments caused by a surrounding brightness or by brightness changes, and b) there is an anomaly of traffic flow in an area surrounding the vehicle, wherein the anomaly of traffic flow is a higher vehicle density in lanes of the vehicle adjacent to a lane of the vehicle, there is a speed decrease of a vehicle in an overtaking lane adjacent to the vehicle relative to the speed of the vehicle, or there is a speed increase of a vehicle in a non-overtaking lane adjacent to the vehicle relative to the speed of the vehicle.

* * * * *